US010014520B2

(12) United States Patent
Yaegashi et al.

(10) Patent No.: US 10,014,520 B2
(45) Date of Patent: Jul. 3, 2018

(54) COMPOSITION THAT ENHANCES DEEP CYCLE PERFORMANCE OF VALVE-REGULATED LEAD-ACID BATTERIES FILLED WITH GEL ELECTROLYTE

(71) Applicant: Exide Technologies GmbH, Buedingen (DE)

(72) Inventors: Satoru Yaegashi, Buedingen (DE); Harald Niepraschk, Buedingen (DE); Olaf Sielemann, Wachtersbach (DE)

(73) Assignee: EXIDE TECHNOLOGIES GMBH, Budingen (DE)

( * ) Notice: Subject to any disclaimer, the term of this patent is extended or adjusted under 35 U.S.C. 154(b) by 829 days.

(21) Appl. No.: 13/664,726

(22) Filed: Oct. 31, 2012

(65) Prior Publication Data

US 2014/0120385 A1    May 1, 2014

(51) Int. Cl.
*H01M 4/14*      (2006.01)
*H01M 4/62*      (2006.01)
*H01M 10/12*     (2006.01)
*H01M 4/02*      (2006.01)

(52) U.S. Cl.
CPC ............. *H01M 4/14* (2013.01); *H01M 4/625* (2013.01); *H01M 10/121* (2013.01); *H01M 2004/021* (2013.01); *H01M 2004/027* (2013.01)

(58) Field of Classification Search
CPC ....... H01M 4/14; H01M 4/625; H01M 10/121
USPC ........................................................ 429/232
See application file for complete search history.

(56) References Cited

U.S. PATENT DOCUMENTS

| | | | |
|---|---|---|---|
| 4,401,730 A | 8/1983 | Szymborski et al. | |
| 4,537,842 A | 8/1985 | Sundberg | |
| 5,045,170 A | 9/1991 | Bullock et al. | |
| 5,156,935 A | 10/1992 | Hohjo et al. | |
| 5,441,123 A | 8/1995 | Beckley | |
| 5,547,783 A | 8/1996 | Funato et al. | |
| 6,194,100 B1 | 2/2001 | Vutetakis et al. | |
| 6,265,108 B1 | 7/2001 | Chalasani | |
| RE37,804 E | 7/2002 | Mattan | |
| 6,423,451 B1 | 7/2002 | Larsen | |
| 6,436,581 B1 | 8/2002 | Senyarich et al. | |
| 6,531,248 B1 | 3/2003 | Zguris et al. | |
| 6,548,211 B1 | 4/2003 | Kamada et al. | |
| 7,517,370 B2 | 4/2009 | Petersen et al. | |
| 8,765,297 B2 | 7/2014 | Jagannathan et al. | |
| 2003/0049528 A1 | 3/2003 | Honbo et al. | |
| 2006/0269801 A1 | 11/2006 | Honbo et al. | |
| 2007/0104981 A1 | 5/2007 | Lam et al. | |
| 2008/0003501 A1 | 1/2008 | Vincze et al. | |
| 2008/0089013 A1 | 4/2008 | Zhong et al. | |
| 2008/0107960 A1 | 5/2008 | Furukawa et al. | |
| 2008/0292967 A1 | 11/2008 | Nilsson et al. | |
| 2009/0080142 A1 | 3/2009 | Nanba et al. | |
| 2009/0208780 A1 | 8/2009 | Sun et al. | |
| 2009/0317709 A1 | 12/2009 | Brazis et al. | |
| 2009/0325068 A1 | 12/2009 | Boden et al. | |
| 2010/0015531 A1 | 1/2010 | Dickinson et al. | |
| 2010/0033898 A1 | 2/2010 | Zhong et al. | |
| 2010/0040950 A1 | 2/2010 | Buiel et al. | |
| 2010/0203362 A1 | 8/2010 | Lam et al. | |
| 2011/0053050 A1 | 3/2011 | Lim et al. | |
| 2011/0083966 A1 | 4/2011 | Kirchev | |
| 2011/0159375 A1 | 6/2011 | Feaver et al. | |
| 2011/0250500 A1* | 10/2011 | Ho et al. | 429/226 |
| 2011/0274969 A1 | 11/2011 | Wang | |
| 2012/0003543 A1 | 1/2012 | Kirchev et al. | |
| 2012/0171564 A1 | 7/2012 | Jagannathan et al. | |
| 2012/0211703 A1 | 8/2012 | Atanassova et al. | |
| 2012/0251876 A1 | 10/2012 | Jagannathan | |
| 2013/0070391 A1 | 3/2013 | Zheng | |
| 2014/0120385 A1 | 5/2014 | Yaegashi et al. | |

(Continued)

FOREIGN PATENT DOCUMENTS

EP    1739771    1/2007
EP    1798790    6/2007
(Continued)

OTHER PUBLICATIONS

International Application No. PCT/US2013/067170 International Search Report and Written Opinion dated Feb. 21, 2014, 9 pages.
EP Application No. 1385174.9 Extended European Search Report dated May 25, 2016, 9 pages.
G. Sivaramaiah, et al., An overview of the development of lead/acid traction batteries for electric vehicles in India, Journal of Power Sources, 38 (1992), pp. 165-170.
G.J. May, et al., Gelled-electrolye lead/acid batteries for stationary and traction applications, Journal of Power Sources 40 (1992) pp. 187-193.
G.J. May, Focus Consulting, Performance, Secondary Batteries—Lead-Acid Systems, 2009, pp. 693-704.
H. Kronberger, et al., Investigations of the factors causing performance losses of lead/acid traction batteries, Journal of Power Sources, 50 (1994), pp. 153-162.
(Continued)

*Primary Examiner* — Sean P Cullen
(74) *Attorney, Agent, or Firm* — Cantor Colburn LLP

(57) ABSTRACT

Disclosed herein is a composition for use in a negative active material in a valve regulated lead-acid battery, including a carbon material having a BET surface area from 150 $m^2/g$ to 2000 $m^2/g$ and having a $D_{90}$-value greater than 5 μm with the amount of carbon material ranging from 0.1 wt % to 1.5 wt % based on the total weight of the composition. Also disclosed herein is a valve regulated lead-acid battery, including a positive plate, a negative plate, a separator, and an electrolyte disposed in a container with a valve, the negative plate including a substrate of lead or a lead alloy and a negative active material of a composition including a carbon material having a BET surface area from 150 $m^2/g$ to 2000 $m^2/g$ and having a $D_{90}$-value greater than 5 μm, the amount of carbon material ranging from 0.1 wt % to 1.5 wt % based on the total weight of the composition.

20 Claims, No Drawings

(56) References Cited

U.S. PATENT DOCUMENTS

| | | | |
|---|---|---|---|
| 2014/0120386 | A1 | 5/2014 | Jagannathan et al. |
| 2014/0255775 | A1 | 9/2014 | Jagannathan et al. |
| 2015/0180081 | A1 | 6/2015 | Kesper |
| 2016/0248097 | A1 | 8/2016 | Jagannathan et al. |

FOREIGN PATENT DOCUMENTS

| | | |
|---|---|---|
| EP | 1876663 | 1/2008 |
| EP | 2070875 | 1/2008 |
| EP | 2262042 | 12/2010 |
| JP | 2001332264 | 11/2001 |
| JP | 2006196191 | 7/2006 |
| JP | 2007012596 | 1/2007 |
| JP | 2007273367 | 10/2007 |
| WO | 2008070914 | 6/2008 |
| WO | 2010008392 | 1/2010 |
| WO | 2011056537 | 5/2011 |
| WO | WO 2011053670 A1 * | 5/2011 |

OTHER PUBLICATIONS

J.M. Stevenson, et al., Tubular positive plate batteries for motive power and electric vehicle applications, Journal of Power Sources, 40 (1992), pp. 39-46.
S. Meenakorn, et al., Effects of Carbon Structure and Mixing Sequence in an Expander on the Capacity of Negative Electrodes in a Traction Battery, Journals of Materials Engineering and Performance, vol. 24(1) Jan. 2015, 8 pages.
T.R. Crompton, Battery Reference Book, Chapter 32—Lead-Acid Secondary Batteries, Mar. 20, 2000, 11 pages.
T.R. Crompton, Battery Reference Book, Mar. 20, 2000, Chapter 48—Taper Charging of Lead-Acid Motive Power Batteries, 6 pages.
EP Application No. 12754221.5 Office Action dated May 11, 2015, 4 pages.
EP Application No. 12754221.5 Office Action dated Feb. 11, 2016, 6 pages.
U.S. Appl. No. 13/664,871 Non-Final Office Action dated Oct. 28, 2015, 20 pages.
EP Application No. 11854723.1 Office Action dated Apr. 3, 2017, 4 pages.
EP Application No. 13851714.9 Office Action dated Mar. 13, 2017, 6 pages.
U.S. Appl. No. 13/664,871 Non-Final Office Action dated Apr. 21, 2017, 28 pages.
CN Application No. 201380056552.8 First Office Action dated Oct. 18, 2016, 7 pages.
EP Application No. 12754221.5 Office Action dated Nov. 16, 2016, 4 pages.
A. Zuttel, et al., Hydrogen-Carbon Studies, IEA Task 12: Metal Hydrides and Carbon for Hydrogen Storage 2001, pp. 108-113.
Applications for TIMREX (R) graphites, TIMCAL Ltd., 2003, 6 pages.
B. Mahato, Lead Acid Battery Expander, II. Expander Activity Correlation Between Microelectrode and Pasted Electrode, J. EZectrochem. Soc.: Electrochemical Science and Technology, Jul. 1981, pp. 1416-1422.
Canadian Patent Application No. 2,858,050 Office Action dated Oct. 23, 2017, 4 pages.
CN Application No. 201380056552.8 Second Office Action dated Sep. 5, 2017, 6 pages.
D. Pavlov et al., Influence of expander components on the processes at the negative plates of lead-acid cells on high-rate partial-state-of-charge cycling. Part II Effect of carbon additives on the processes of charge and discharge of negative plates, Journal of Power Sources 195 (2010) pp. 4444-4457.
D. Pavlov et al., Influence of expander components on the processes at the negative plates of lead-acid cells on high-rate partial-state-of-charge cycling. Part I: Effect of lignosulfonates and BaSO4 on the processes of charge and discharge of negative plates, Journal of Power Sources 195 (2010) pp. 4435-4-443.
D.P. Boden, Selection of pre-blended expanders for optimum lead/acid battery performance, Journal of Power Sources 73, 1998, 89-92.
EP Application No. 12754221.5 Extended European Search Report dated Jul. 25, 2014, 10 pages.
EP Application No. 17153092.6 Extended EP Search Report dated May 30, 2017, 9 pages.
G. Toussaint et al., Effect of additives in compressed lead-acid batteries, Journal of Power Sources 144 (2005) pp. 546-551.
Hans Bode (Translated by Brodd and Kordesch), Lead-Acid Batteries, The Electrochemical Society, Inc., Chapters 1 and 3, 1977, 42 pages.
International Application No. PCT/US2011/067137 International Search Report dated Sep. 7, 2012, 5 pages.
International Application No. PCT/US2012/027972 International Search Report dated Sep. 26, 2012, 6 pages.
International Application No. PCT/US2012/027972, International Preliminary Report on Patentability and Written Opinion dated Sep. 10, 2013, 14 pages.
J.D. Newell, et al., Porous microspheres as additives in lead-acid batteries, Journal of Power Sources 188 (2009) pp. 292-295.
JP Patent Application No. 2015-539890 Office Action dated Sep. 5, 2017, 3 pages.
K.R. Bullock, et al., Use of Conductive Materials to Enhance Lead-Acid Battery Formation, J. Electrochem. Soc., vol. 138, No. 12, Dec. 1991, pp. 3545-3549.
M. Fernandez et al., The use of activated carbon and graphite for the development of lead-acid batteries for hybrid vehicle applications, Journal of Power Sources, vol. 195, No. 14, Jul. 15, 2010, pp. 4458-4469.
M. Shiomi et al., Effects of carbon in negative plates on cycle-life performance of value-regulated lead/acid batteries, Journal of Power Sources 64 (1997) pp. 147-152.
M. Spahr, et al., "Development of carbon conductive additives for advanced lithium ion batteries," Journal of Power Sources, vol. 196, Jul. 8, 2010, pp. 3404-3413.
M.E. Spahr et al., Poster, Comparison of the Porosity and Surface Properties of High Surface Area Graphite and Carbon Black Catalyst Supports, TIMCAL Graphite & Carbon, 2005, 1 page.
M.L. Soria et al., New developments on valve-regulated lead-acid batteries for advanced automotive electrical systems,; Journal of Power Sources, Elsevier SA, CH, vol. 144, No. 2, Jun. 15, 2005, pp. 473-485.
M.P.J. Brennan, et al., Expander Action in Lead-Acid Battery, III. Impedance and Passivation Studies of Some Tanning Agents as Potential Expanders, Electroanalytical Chemistry and Interfacial Electrochemistry 54 (1974), 6 pages.
N.A. Hampson, et al., Fundamentals of Lead-Acid Cells, Part XIII. The Influence of Additives on the Charge and Discharge Processes of the Negative Electrode, J. Electroanal. Chem., 119 (1981) pp. 3-15.
P.T. Moseley, et al., The role of carbon in value-regulated lead-acid battery technology, Journal of Power Sources 157 (2006) pp. 3-10.
R. Ponraj et al., Investigation on electronically conductive additives to improve positive active material utilization in lead-acid batteries, Journal of Power Sources 189 (2009) pp. 1199-1203.
Technical Data Sheet for TIMREX (R) HSAG300, High Surface Graphite, TIMCAL Graphite & Carbon, Version Sep. 2006, 1 page.
Trojan Battery Company Brochure, 2014, 2 pages.
U.S. Appl. No. 12/984,023 Final Office Action dated Aug. 29, 2013, 13 pages.
U.S. Appl. No. 12/984,023 Non-Final Office Action dated Apr. 1, 2013, 12 pages.
U.S. Appl. No. 12/984,023 Notice of Allowance dated Feb. 19, 2014, 11 pages.
U.S. Appl. No. 13/413,923 Final Office Action dated Jun. 19, 2015, 20 pages.
U.S. Appl. No. 13/413,923 Non-Final Office Action dated Oct. 8, 2014, 14 pages.
U.S. Appl. No. 13/664,871 Final Office Action, dated Nov. 29, 2017, 26 pages.

(56) References Cited

OTHER PUBLICATIONS

U.S. Appl. No. 13/664,871 Non-Final Office Action dated Oct. 22, 2014, 9 pages.
U.S. Appl. No. 14/279,492 Non-Final Office Action dated Jul. 26, 2017, 47 pages.
W. Kao, et al., A Conductive Additive to Enhance Formation of a Lead/Acid Battery, J. Electrochem. Soc., vol. 139, No. 4, Apr. 1992, pp. L41-L43.
W. Murray, et al., "Electrode material enhancements for lead-acid batteries," 2011 NDIA Ground Vehicle Systems Engineering and Technology Symposium, report No. 22007, Aug. 9, 2011, 5 pages.
Y. Guo, et al., Current and potential distributions on positive plates with conductive $Pb_3O_4$ and $BaPbO_3$ in their formation and discharge, Journal of Power Sources 183 (2008) 381-397.
EP Application No. 12754221.5 Office Action dated Oct. 5, 2017, 6 pages.
U.S. Appl. No. 15/005,254 Non-Final Office Action dated Mar. 8, 2018, 45 pages.
EP Application No. 17153092.6 Office Action dated Apr. 13, 2018, 5 pages.
CA Application No. 2,858,055 Office Action dated May 2, 2018, 4 pages.

\* cited by examiner

COMPOSITION THAT ENHANCES DEEP CYCLE PERFORMANCE OF VALVE-REGULATED LEAD-ACID BATTERIES FILLED WITH GEL ELECTROLYTE

FIELD OF THE INVENTION

A composition for use in a negative active material in a valve-regulated lead-acid battery filled with a gel electrolyte for deep cycling applications.

BACKGROUND

The valve-regulated lead-acid battery has been developed as an advanced lead-acid battery. A valve-regulated lead-acid battery filled with gel electrolyte, a so-called gel battery, is often used for industrial applications at deep discharge and deep charge cycle operation as its immobilized gel electrolyte reduces acid stratification and eventually extends the battery service life. As another type of valve-regulated lead-acid battery, using absorbed glass mat separators, so called AGM battery is often used for automotive applications.

Conventionally, small amount of carbon black has been added to negative electrode active material of lead-acid battery. Generally, about 0.2 wt % of carbon black is added in the negative paste regardless whether the battery is valve-regulated or conventional flooded type. This amount is thought to be sufficient enough to improve the formation process.

Recently, high loading of conductive carbon materials such as carbon black, graphite has been investigated to attempt to improve performances of valve-regulated lead-acid battery, especially with an absorbed glass matt separator design.

U.S. Pat. No. 5,547,783 discloses adding 0.5 to 7.5 wt % of conductive additives such as carbon black, acetylene black, polyaniline, tin powder, tin compound powder, etc. to a negative active material of a valve-regulated lead-acid battery with absorbed glass matt separator, where the theoretical capacity of negative active material in the battery is less than that of the positive active material. This variation led to an extended battery cycle life.

US 2009/0325068 discloses that the concentration of up to 6% of graphite or mixtures of carbon black and graphite minimized the accumulation of lead sulfate on the surface of the negative plate during high rate partial state of charge battery operation and enhanced battery performance.

There are several drawbacks regarding usage of conductive carbon additives to lead acid battery. Mostly, improved battery performances at the partial state of charge operation of VRLA battery with absorbed glass matt separator have been reported.

For VRLA battery filled with gel electrolyte, especially, in a deep charge and discharge cycle operation, not many investigations are reported. Adding higher amount of low density material such as carbon black or graphite to the negative paste typically requires adding more water in order to obtain suitable processability, but this in turn results in certain disadvantages, such as, a reduced paste density and a very poor active mass adhesion.

Japanese patent number 43-64460 teaches that the combination of 1 to 5 wt % of a carbon material having a high specific surface area and 1 to 5 wt % of conductive carbon material in a negative active mass of valve regulated lead-acid battery with absorbed glass matt separator gave an advantage to high rate discharge performance at the partial state of charge battery operation.

US 2010/0015531 discloses adding 1 to 2 wt % of a carbon material having a high specific surface area, e.g., having a meso-pore volume of greater than about 0.1 cm$^3$/g. The resultant battery maintains automotive battery performances despite containing less lead.

Several drawbacks regarding the use of carbon material having a high specific surface area for negative active material of lead-acid battery, particularly a valve regulated lead-acid battery with an absorbed glass mat separator or automotive application are mostly reported. For a valve regulated lead-acid battery with a gel electrolyte, especially in a deep discharge and charge cycle operation, fewer drawbacks are disclosed.

However, it remains a technical challenge to improve deep cycling performance of the gel electrolyte filled valve regulated lead acid batteries while maintaining discharge performance. The inventors have sought to overcome this technical challenge by the compositions disclosed herein.

SUMMARY

Disclosed herein is a composition for use in a negative active material in a valve regulated lead-acid battery, comprising: a carbon material having a BET surface area from 150 m$^2$/g to 2000 m$^2$/g and having a $D_{90}$-value greater than 5 μm; wherein the amount of carbon material ranges from 0.1 wt % to 1.5 wt % based on the total weight of the composition. Also disclosed herein is valve regulated lead-acid battery, comprising: a positive plate, a negative plate, a separator, and an electrolyte disposed in a container comprising a valve, wherein the negative plate comprises a substrate comprising lead or a lead alloy and a negative active material comprised of a composition comprising a carbon material having a BET surface area from 150 m$^2$/g to 2000 m$^2$/g and having a $D_{90}$-value greater than 5 μm; wherein the amount of carbon material ranges from 0.1 wt % to 1.5 wt % based on the total weight of the composition.

DETAILED DESCRIPTION

Definitions

The phrase "a" or "an" entity as used herein refers to one or more of that entity; for example, the expression "a positive plate" refers to one or more positive plates, or alternative, at least one positive plate to reflect the plurality commonly associated with "a" or "an." As such, the terms "a" (or "an"), "one or more", and "at least one" can be used interchangeably herein.

The terms "optional" or "optionally" as used herein means that a subsequently described event or circumstance may but need not occur, and that the description includes instances where the event or circumstance occurs and instances in which it does not.

Numerical values associated with disclosed and claimed parameters, such as, BET surface area, $D_{90}$-value, % by weight, etc. are understood to correspond to values subject to measurement and/or observation, which means that associated with said numerical values are standard experimental errors. As such, any such numerical value appearing as a claim term should not be construed to mean that said value is devoid from standard experimental error. The term "about," as used herein, is intended to express the standard error for a given measurement and/or observable and should be afforded its plain and customary meaning of "approximately."

BET surface area is measured by a low temperature nitrogen adsorption method, based on the original method of Brunauer et al. J. Am. Chem. Soc. (1938) 60(2): 309-319, and has been adopted by ASTM as standard method D 6556.

The term "$D_{90}$-value" describes the diameter where ninety percent of a particle distribution has a smaller particle size and ten percent has a larger particle size. The $D_{90}$-value can be measured by electron microscopy, using such techniques known in the art, such as described in ASTM B 822, ISO 13320:2009, ASTM D3849-07 (2011), etc.

The expression "activated carbon," as used herein refers to a carbon material having a BET surface area that ranges from 150 m$^2$/g to 2000 m$^2$/g and having a $D_{90}$-value greater than 5 μm that includes various combinations and subcombinations of the BET surface area and $D_{90}$-value as noted in the third through seventh aspects of the first and second embodiments.

The term "leady oxide," as used herein, refers to a milled material comprised of lead and lead oxide.

The term "sulfated leady oxide," as used herein, refers to a composition comprising leady oxide and lead sulfates.

Embodiments

A first embodiment is directed to a composition for use in a negative active material in a valve regulated lead-acid battery, comprising: a carbon material having a BET surface area that ranges from 150 m$^2$/g to 2000 m$^2$/g and having a $D_{90}$-value greater than 5 μm; wherein the amount of carbon material ranges from 0.1 wt % to 1.5 wt % based on the total weight of the composition.

In a first aspect of the first embodiment, the carbon material comprises an activated carbon, an amorphous carbon, a carbon black, a graphite, a carbon fiber, or a combination thereof.

In a second aspect of the first embodiment, the carbon material comprises an activated carbon, a graphite, a carbon fiber, or a combination thereof.

Examples of commercially available carbon materials having a BET surface area from 150 m$^2$/g to 2000 m$^2$/g and having a $D_{90}$-value greater than 5 include, but are not limited to, an activated carbon (e.g., NORIT PAC BC, NORIT DLC SUPER 30, NORIT DLC SUPRA 50, available from Norit), an amorphous carbon, a carbon black, a graphite (e.g., HSAG 300 or HSAG 400, available from Timcal AG), a carbon fiber (e.g., KYNOL ACF-1603-25, available from Kynol).

In a third aspect of the first embodiment, the carbon material has a BET surface area that ranges from 150 m$^2$/g to 1500 m$^2$/g.

In a fourth aspect of the first embodiment, the carbon material has a BET surface area that ranges from 200 m$^2$/g to 1500 m$^2$/g.

In a fifth aspect of the first embodiment, the carbon material has a $D_{90}$-value that ranges from 5 μm to 2000 μm.

In a sixth aspect of the first embodiment, the carbon material has a $D_{90}$-value that ranges from 5 μm to 100 μm.

In a seventh aspect of the first embodiment the carbon material has a $D_{90}$-value that ranges from 5 μm to 50 μm.

In an eighth aspect of the first embodiment, the amount of carbon material ranges from 0.1 wt % to 1.2 wt % based on the total weight of the composition.

In a ninth aspect of the first embodiment, the amount of carbon material ranges from 0.2 wt % to 1.0 wt % based on the total weight of the composition.

In a tenth aspect of the first embodiment, the composition for use in a negative active material in a valve regulated lead-acid battery further comprises a sulfated leady oxide, a barium sulfate, a fiber, an oxylignin, and water.

In an eleventh aspect of the first embodiment, the composition for use in a negative active material in a valve regulated lead-acid battery further comprises:
  a sulfated leady oxide (in an amount that ranges from 80 wt % to 90 wt %, 82 wt % to 88 wt %, or 84 wt % to 86 wt %, based on the total weight of the composition);
  a barium sulfate ($BaSO_4$, in an amount that ranges from 0.2 wt % to 0.6 wt % or 0.3 wt % to 0.5 wt %, based on the total weight of the composition);
  a fiber (in an amount that ranges from 0.06 wt % to 1.1 wt %, 0.07 wt % to 1.0 wt %, or 0.08 wt % to 0.09 wt %, based on the total weight of the composition);
  an oxylignin (in an amount that ranges from 0.1 to 0.3 wt %, based on the total weight of the composition); and
  water (in an amount that ranges from 12 wt % to 16 wt %, based on the total weight of the composition.

A sulfated leady oxide comprises from 20 wt % to 40 wt % of lead, based on the total weight of the leady oxide, and from 60 wt % to 80 wt % of lead oxide, based on the total weight of the lead and the lead oxide. A sulfated leady oxide may be obtained by contacting leady oxide with sulfuric acid. The contacting may be performed by conventional techniques, such as, for example, pouring, painting, spraying, etc.

An oxylignin, known chemically as sodium lignosulfonate, is commercially available, for example, as Vanisperse A.

Examples of suitable fibers include, but are not limited to a fiberglass; a carbon fiber, such as, a pitch based carbon fiber; a synthetic plastic fiber, including but not limited to, an acrylic fiber, and a polyester fiber (e.g., polyester stapled fibers available from Woongjin Chemical Co., Ltd.); a conductive ceramic fiber, or combinations thereof.

A suitable process for preparing a composition for use in a negative active material in a valve regulated lead-acid battery is described in US 2012/0171564 (U.S. Ser. No. 12/984,023).

A second embodiment is directed to a composition for use in a negative active material in a valve regulated lead-acid battery, comprising: a carbon material having a BET surface area from 150 m$^2$/g to 2000 m$^2$/g and having a $D_{90}$-value greater than 5 μm; wherein the amount of carbon material ranges from 0.1 wt % to 1.5 wt % based on the total weight of the composition; and wherein the valve regulated lead-acid battery exhibits an improvement in a deep cycling test that ranges from 150% to 400% compared to a valve regulated lead-acid battery that does not contain the carbon material having a BET surface area that ranges from 150 m$^2$/g to 2000 m$^2$/g and having a $D_{90}$-value greater than about 5 μm.

In a first aspect of the second embodiment, the carbon material comprises an activated carbon, an amorphous carbon, a carbon black, a graphite, a carbon fiber, or a combination thereof.

In a second aspect of the second embodiment, the carbon material comprises an activated carbon, a graphite, a carbon fiber, or a combination thereof.

In a third aspect of the second embodiment, the carbon material has a BET surface area that ranges from 150 m$^2$/g to 1500 m$^2$/g.

In a fourth aspect of the second embodiment, the carbon material has a BET surface area that ranges from 200 m$^2$/g to 1500 m$^2$/g.

In a fifth aspect of the second embodiment, the carbon material has a D$_{90}$-value that ranges from 5 μm to 2000 μm.

In a sixth aspect of the second embodiment, the carbon material has a D$_{90}$-value that ranges from 5 μm to 100 μm.

In a seventh aspect of the second embodiment the carbon material has a D$_{90}$-value that ranges from 5 μm to 50 μm.

In an eighth aspect of the second embodiment, the amount of carbon material ranges from 0.1 wt % to 1.2 wt % based on the total weight of the composition.

In a ninth aspect of the second embodiment, the amount of carbon material ranges from 0.2 wt % to 1.0 wt % based on the total weight of the composition.

In a tenth aspect of the second embodiment, the composition for use in a negative active material in a valve regulated lead-acid battery further comprises a sulfated leady oxide, a barium sulfate, a fiber, an oxylignin, and water.

In an eleventh aspect of the second embodiment, the composition for use in a negative active material in a valve regulated lead-acid battery further comprises:
- a sulfated leady oxide (in an amount that ranges from 80 wt % to 90 wt %, 82 wt % to 88 wt %, or 84 wt % to 86 wt %, based on the total weight of the composition);
- a barium sulfate (BaSO$_4$, in an amount that ranges from 0.2 wt % to 0.6 wt % or 0.3 wt % to 0.5 wt %, based on the total weight of the composition);
- a fiber (in an amount that ranges from 0.06 wt % to 1.1 wt %, 0.07 wt % to 1.0 wt %, or 0.08 wt % to 0.09 wt %, based on the total weight of the composition);
- an oxylignin (in an amount that ranges from 0.1 to 0.3 wt %, based on total weight of composition); and
- water (in an amount that ranges from 12 wt % to 16 wt %, based on the total weight of the composition).

In a twelfth aspect of the second embodiment, the valve regulated lead-acid battery exhibits an improvement in a deep cycling test that ranges from 150% to 400% compared to a valve regulated lead-acid battery that does not comprise the carbon material having a BET surface area from 150 m$^2$/g to 2000 m$^2$/g and having a D$_{90}$-value greater than 5 μm.

A third embodiment is directed to a valve regulated lead-acid battery, comprising: a positive plate, a negative plate, a separator, and an electrolyte disposed in a container comprising a valve, wherein the negative plate comprises a substrate comprising lead or a lead alloy and a negative active material comprised of a composition comprising a carbon material having a BET surface area from about 150 m$^2$/g to about 2000 m$^2$/g and having a D$_{90}$-value greater than about 5 μm; and wherein the amount of carbon material ranges from about 0.1 wt % to about 1.5 wt % based on the total weight of the composition.

In a first aspect of the third embodiment, the carbon material comprises an activated carbon, an amorphous carbon, a carbon black, a graphite, a carbon fiber, or a combination thereof.

In a second aspect of the third embodiment, the carbon material comprises an activated carbon, a graphite, a carbon fiber, or a combination thereof.

In a third aspect of the third embodiment, the carbon material has a BET surface area that ranges from 150 m$^2$/g to 1500 m$^2$/g.

In a fourth aspect of the third embodiment, the carbon material has a BET surface area that ranges from 200 m$^2$/g to 1500 m$^2$/g.

In a fifth aspect of the third embodiment, the carbon material has a D$_{90}$-value that ranges from 5 μm to 2000 μm.

In a sixth aspect of the third embodiment, the carbon material has a D$_{90}$-value that ranges from 5 μm to 100 μm.

In a seventh aspect of the third embodiment the carbon material has a D$_{90}$-value that ranges from 5 μm to 50 μm.

In an eighth aspect of the third embodiment, the amount of carbon material ranges from 0.1 wt % to 1.2 wt % based on the total weight of the composition.

In a ninth aspect of the third embodiment, the amount of carbon material ranges from 0.2 wt % to 1.0 wt % based on the total weight of the composition.

In a tenth aspect of the third embodiment, the composition further comprises a sulfated leady oxide, a barium sulfate, a fiber, an oxylignin, and water.

In an eleventh aspect of the third embodiment, the composition further comprises:
- a sulfated leady oxide (in an amount that ranges from 80 wt % to 90 wt %, 82 wt % to 88 wt %, or 84 wt % to 86 wt %, based on the total weight of the composition);
- a barium sulfate (BaSO$_4$, in an amount that ranges from 0.2 wt % to 0.6 wt % or 0.3 wt % to 0.5 wt %, based on the total weight of the composition);
- a fiber (in an amount that ranges from 0.06 wt % to 1.1 wt %, 0.07 wt % to 1.0 wt %, or 0.08 wt % to 0.09 wt %, based on the total weight of the composition);
- an oxylignin (in an amount that ranges from 0.1 to 0.3 wt %, based on the total weight of the composition); and
- water (in an amount that ranges from 12 wt % to 16 wt %, based on the total weight of the composition).

In a twelfth aspect of the third embodiment, the valve is an overpressure valve.

Typical valve regulated lead-acid batteries are described in US 2012/0171564 (U.S. Ser. No. 12/984,023).

A fourth embodiment is directed to a valve regulated lead-acid battery, comprising: a positive plate, a negative plate, a separator, and an electrolyte disposed in a container comprising a valve, wherein the negative plate comprises a substrate comprising lead or a lead alloy and a negative active material comprised of a composition comprising a carbon material having a BET surface area that ranges from 150 m$^2$/g to 2000 m$^2$/g and having a D$_{90}$-value greater than about 5 μm; wherein the amount of carbon material ranges from 0.1 wt % to 1.5 wt % based on the total weight of the composition; and wherein the valve regulated lead-acid battery exhibits an improvement in a deep cycling test that ranges from 150% to 400% compared to a valve regulated lead-acid battery that does not comprise the carbon material having a BET surface area that ranges from 150 m$^2$/g to 2000 m$^2$/g and having a D$_{90}$-value greater than about 5 μm.

In a first aspect of the fourth embodiment, the carbon material comprises an activated carbon, an amorphous carbon, a carbon black, a graphite, a carbon fiber, or a combination thereof.

In a second aspect of the fourth embodiment, the carbon material comprises an activated carbon, a graphite, a carbon fiber, or a combination thereof.

In a third aspect of the fourth embodiment, the carbon material has a BET surface area that ranges from 150 m$^2$/g to 1500 m$^2$/g.

In a fourth aspect of the fourth embodiment, the carbon material has a BET surface area that ranges from 200 m$^2$/g to 1500 m$^2$/g.

In a fifth aspect of the fourth embodiment, the carbon material has a D$_{90}$-value that ranges from 5 μm to 2000 μm.

In a sixth aspect of the fourth embodiment, the carbon material has a D$_{90}$-value that ranges from 5 μm to 100 μm.

In a seventh aspect of the fourth embodiment the carbon material has a $D_{90}$-value that ranges from 5 µm to 50 µm.

In an eighth aspect of the fourth embodiment, the amount of carbon material ranges from 0.1 wt % to 1.2 wt % based on the total weight of the composition.

In a ninth aspect of the fourth embodiment, the amount of carbon material ranges from 0.2 wt % to 1.0 wt % based on the total weight of the composition.

In a tenth aspect of the fourth embodiment, the composition further comprises a sulfated leady oxide, a barium sulfate, a fiber, an oxylignin, and water.

In an eleventh aspect of the fourth embodiment, the composition further comprises:
a sulfated leady oxide (in an amount that ranges from 80 wt % to 90 wt %, 82 wt % to 88 wt %, or 84 wt % to 86 wt %, based on the total weight of the composition);
a barium sulfate ($BaSO_4$, in an amount that ranges from 0.2 wt % to 0.6 wt % or 0.3 wt % to 0.5 wt %, based on the total weight of the composition);
a fiber (in an amount that ranges from 0.06 wt % to 1.1 wt %, 0.07 wt % to 1.0 wt %, or 0.08 wt % to 0.09 wt %, based on the total weight of the composition);
an oxylignin (in an amount that ranges from 0.1 to 0.3 wt %, based on the total weight of the composition); and
water (in an amount that ranges from 12 wt % to 16 wt %, based on the total weight of the composition).

In a twelfth aspect of the fourth embodiment, the valve is an overpressure valve.

In a thirteenth aspect of the fourth embodiment, the valve regulated lead-acid battery exhibits an improvement in a deep cycling test that ranges from 150% to 400% compared to a valve regulated lead-acid battery that does not contain the carbon material having a BET surface area that ranges from 150 $m^2/g$ to 2000 $m^2/g$ and having a $D_{90}$-value greater than about 5 µm.

As will be seen from the examples included herein the composition of the first embodiment is useful for a valve regulated lead-acid battery for deep cycling applications.

EXAMPLES

Not to be limited by way of example, the following examples serve to facilitate a better understanding of the disclosure.

A study was performed to understand the influence of the BET surface area and particle size of a certain carbon material in the negative electrode of a valve regulated lead-acid battery filled with gel electrolyte (gel battery) for deep cycling applications.

A composition was prepared by adding sulfated leady oxide, barium sulfate ($BaSO_4$), polymeric fibers, an oxylignin, distilled water, and a carbon black, an activated carbon, a high surface area graphite ("Graphite I"), a furnace-type (FT) carbon black, an expanded graphite ("Graphite II"), or a combination thereof, to a paste-mixer, as described herein.

The following table provides the make up of the compositions considered herein.

| | Amount of Material (wt %) | | | | | |
|---|---|---|---|---|---|---|
| Material | Control | A | B | C | D | E |
| Sulfated leady oxide | 86.12 | 85.09 | 86.64 | 84.74 | 80.46 | 85.31 |
| $BaSO_4$ | 0.43 | 0.43 | 0.43 | 0.42 | 0.40 | 0.43 |

| | Amount of Material (wt %) | | | | | |
|---|---|---|---|---|---|---|
| Material | Control | A | B | C | D | E |
| Polymeric fiber | 0.09 | 0.09 | 0.09 | 0.08 | 0.08 | 0.09 |
| Oxylignin | 0.18 | 0.18 | 0.18 | 0.18 | 0.17 | 0.18 |
| Carbon Black | 0.18 | 0.18 | — | — | — | — |
| Activated Carbon | — | 0.43 | — | — | — | — |
| Graphite I | — | — | 0.18 | 1.02 | — | — |
| FT Carbon Black | — | — | — | — | 2.01 | 0.18 |
| Graphite II | — | — | — | — | 0.97 | — |
| DI Water | 13.00 | 13.61 | 12.48 | 13.56 | 15.91 | 13.82 |
| Total | 100.00 | 100.00 | 100.00 | 100.00 | 100.00 | 100.00 |
| Density of paste (g/cc) | 4.32 | 4.28 | 4.35 | 4.08 | 3.75 | 4.36 |

The composition, designated as "Control," contains no carbon material having a BET surface area that ranges from 150 $m^2/g$ to 2000 $m^2/g$ and having a $D_{90}$-value greater than 5 µm. Instead, the Control contains a carbon material having a BET surface area of 20 $m^2/g$ and an average primary particle size of about 95 nm.

Compositions designated as A, B, and C comprise a carbon material having a BET surface area that ranges from 150 $m^2/g$ to 2000 $m^2/g$ and having a $D_{90}$-value greater than 5 µm; wherein the amount of carbon material ranges from 0.1 wt % to 1.5 wt % based on the total weight of the composition.

Composition A comprises about 0.43 wt % of an activated carbon having a BET surface area of about 1200 $m^2/g$ and a $D_{90}$-value of about 9 µm.

Compositions B and C comprise about 0.18 wt % and about 1.02 wt %, respectively, of a high surface area graphite having BET surface area of about 280 $m^2/g$ and a $D_{90}$-value of about 32 µm.

Compositions designated as D and E are comparative examples.

Composition D contains as a carbon material (i) a 2.01 wt % of a furnace-type carbon black having a BET surface area of about 250 $m^2/g$ and an average primary particle size of 18 nm and (ii) about 0.97 wt % of an expanded graphite having a BET surface area of about 30 $m^2/g$ and a particle size value that ranges from about 10 to about 50 µm.

Composition E contains as a carbon material about 0.18 wt % of a furnace-type carbon black having a BET surface area of about 250 $m^2/g$ and an average primary particle size of 18 nm.

All compositions were processed into negative plates. Cured plates were assembled with counter positive plates and separators. After assembling unformed batteries, the formation process was initiated and followed by a gel electrolyte filling process, eventually 60 Ah (C20) nominal capacity gel batteries were built for the following battery tests.

Deep cycle tests were performed as follows. Batteries were discharged with constant current of 10 A (5-hour-rate) from fully charged state until battery voltage reached at 10.2V and charged with maximum voltage of 14.4V and maximum current of 10 A for 16 hours at room temperature. Testing was terminated once battery discharge capacity has become less than 40.8 Ah which is 80% of nominal C5 capacity.

Discharge tests were conducted before 5-hour-rate deep cycle test started for all batteries. At least two discharge tests were conducted for each battery. The C5 capacity in Ah was determined by discharging the battery with a specified current until a specified end-of-discharge voltage was reached. This was done repeatedly (cycles) until the discharge capacity reached a specified limit (80% C5). In each example, the test was terminated after the battery reached the C5-limit capacity of 40.8 Ah. The number of C5-cycles required to reach the C5-limit capacity of 40.8 Ah were recorded for each battery.

The following table represents the results for each composition in which the "Deep Cycling" value (%) was obtained by multiplying the ratio of the number of C5-cycles required to reach the C5-limit for a given battery containing the designated composition to the number of C5-cycles required to reach the C5-limit for a battery containing the control composition by 100.

| Battery Composition | Deep Cycling (%) |
|---|---|
| A | 178 |
| B | 384 |
| C | 288 |
| D | 64 |
| E | 100 |

Gel batteries containing composition A improved deep cycle life performance by about 178% relative to the gel battery containing the control composition.

Gel batteries containing compositions B and C improved deep cycle life performance by 384% and 288%, respectively.

Gel batteries containing composition D gave no improvement in deep cycle life performance, but instead resulted in a negative impact to high rate discharge performance.

Gel batteries containing composition E showed no net improvement in deep cycling behavior.

Compositions A, B, and C, each of which comprising a carbon material having a BET surface area that ranges from 150 $m^2/g$ to 2000 $m^2/g$ and having a $D_{90}$-value greater than 5 μm; wherein the amount of carbon material ranges from 0.1 wt % to 1.5 wt % based on the total weight of the composition improved deep cycle life performance of a gel battery.

In contrast, composition D containing a higher amount of carbon black and expanded graphite showed no improvement in deep cycling performance and insufficient discharge performances. Moreover, composition E containing a carbon material having a BET surface area of about 250 $m^2/g$ did not extend deep cyclic behavior. Based on these results, it is believed that adding a carbon material having agglomerated structure such as carbon blacks would not extend deep cycle life of gel battery.

The subject matter of US 2012/0171564 (U.S. Ser. No. 12/984,023, filed on Jan. 4, 2011) is hereby incorporated by reference. The individual components shown in outline or designated by blocks in the Drawings disclosed in US 2012/0171564 are all well-known in the battery arts, and their specific construction and operation are not critical to the operation or best mode for carrying out the invention.

Although a full and complete description is believed to be contained herein, certain patent and non-patent references may include certain essential subject matter. To the extent that these patent and non-patent references describe essential subject matter, these references are hereby incorporated by reference in their entirety. It is understood that the meanings of the incorporated subject matter are subservient to the meanings of the subject matter disclosed herein.

The foregoing description provides illustration and description, but is not intended to be exhaustive or to limit the claimed subject matter. Modifications and variations are possible in light of the above teachings or may be acquired from practice of the invention. Thus, it is noted that the scope of the invention is defined by the claims and their equivalents.

What is claimed is:

1. A composition for use in a negative active material in a valve regulated lead-acid battery, comprising:
    a carbon material having a BET surface area from 150 $m^2/g$ to 2000 $m^2/g$ and having a $D_{90}$-value greater than 5 μm;
    wherein the amount of carbon material ranges from 0.1 wt % to 1.5 wt % based on the total weight of the composition.

2. The composition of claim 1, wherein the carbon material comprises an activated carbon, an amorphous carbon, a carbon black, a graphite, a carbon fiber, or a combination thereof.

3. The composition of claim 1, wherein the carbon material comprises an activated carbon, a graphite, a carbon fiber, or a combination thereof.

4. The composition of claim 1, wherein the BET surface area ranges from 150 $m^2/g$ to 1500 $m^2/g$.

5. The composition of claim 1, wherein the BET surface area ranges from 200 $m^2/g$ to 1500 $m^2/g$.

6. The composition of claim 1, wherein the $D_{90}$-value ranges from 5 μm to 2000 μm.

7. The composition of claim 1, wherein the $D_{90}$-value ranges from 5 μm to 100 μm.

8. The composition of claim 1, wherein the $D_{90}$-value ranges from 5 μm to 50 μm.

9. The composition of claim 1, wherein the amount of carbon material ranges from 0.1 wt % to 1.2 wt % based on the total weight of the composition.

10. The composition of claim 1, wherein the amount of carbon material ranges from 0.2 wt % to 1.0 wt % based on the total weight of the composition.

11. A valve regulated lead-acid battery, comprising:
    a positive plate, a negative plate, a separator, and an electrolyte disposed in a container comprising a valve,
    wherein the negative plate comprises
    a substrate comprising lead or a lead alloy and
    a negative active material comprised of a composition comprising a carbon material having a BET surface area from 150 $m^2/g$ to 2000 $m^2/g$ and having a $D_{90}$-value greater than 5 μm;
    wherein the amount of carbon material ranges from 0.1 wt % to 1.5 wt % based on the total weight of the composition.

12. The battery of claim 11, wherein the carbon material comprises an activated carbon, an amorphous carbon, a carbon black, a graphite, a carbon fiber, or a combination thereof.

13. The battery of claim 11, wherein the carbon material comprises an activated carbon, a graphite, a carbon fiber, or a combination thereof.

14. The battery of claim 11, wherein the BET surface area ranges from 150 $m^2/g$ to 1500 $m^2/g$.

15. The battery of claim 11, wherein the BET surface area ranges from 200 $m^2/g$ to 1500 $m^2/g$.

16. The battery of claim 11, wherein the $D_{90}$-value ranges from 5 μm to 2000 μm.

17. The battery of claim 11, wherein the $D_{90}$-value ranges from 5 μm to 100 μm.

18. The battery of claim 11, wherein the $D_{90}$-value ranges from 5 μm to 50 μm.

19. The battery of claim 11, wherein the amount of carbon material ranges from 0.1 wt % to 1.2 wt % based on the total weight of the composition.

20. The battery of claim 11, wherein the amount of carbon material ranges from 0.2 wt % to 1.0 wt % based on the total weight of the composition.

* * * * *